(No Model.)  H. A. BIERLEY.  7 Sheets—Sheet 1.
CASH REGISTER.

No. 462,615.  Patented Nov. 3, 1891.

(No Model.) H. A. BIERLEY. 7 Sheets—Sheet 2.
CASH REGISTER.

No. 462,615. Patented Nov. 3, 1891.

WITNESSES: INVENTOR:
F. L. Ourand Henry A. Bierley
Jo. L. Coombs by Sams Bagger & Co
Attorneys.

(No Model.)  7 Sheets—Sheet 3.
H. A. BIERLEY.
CASH REGISTER.
No. 462,615. Patented Nov. 3, 1891.
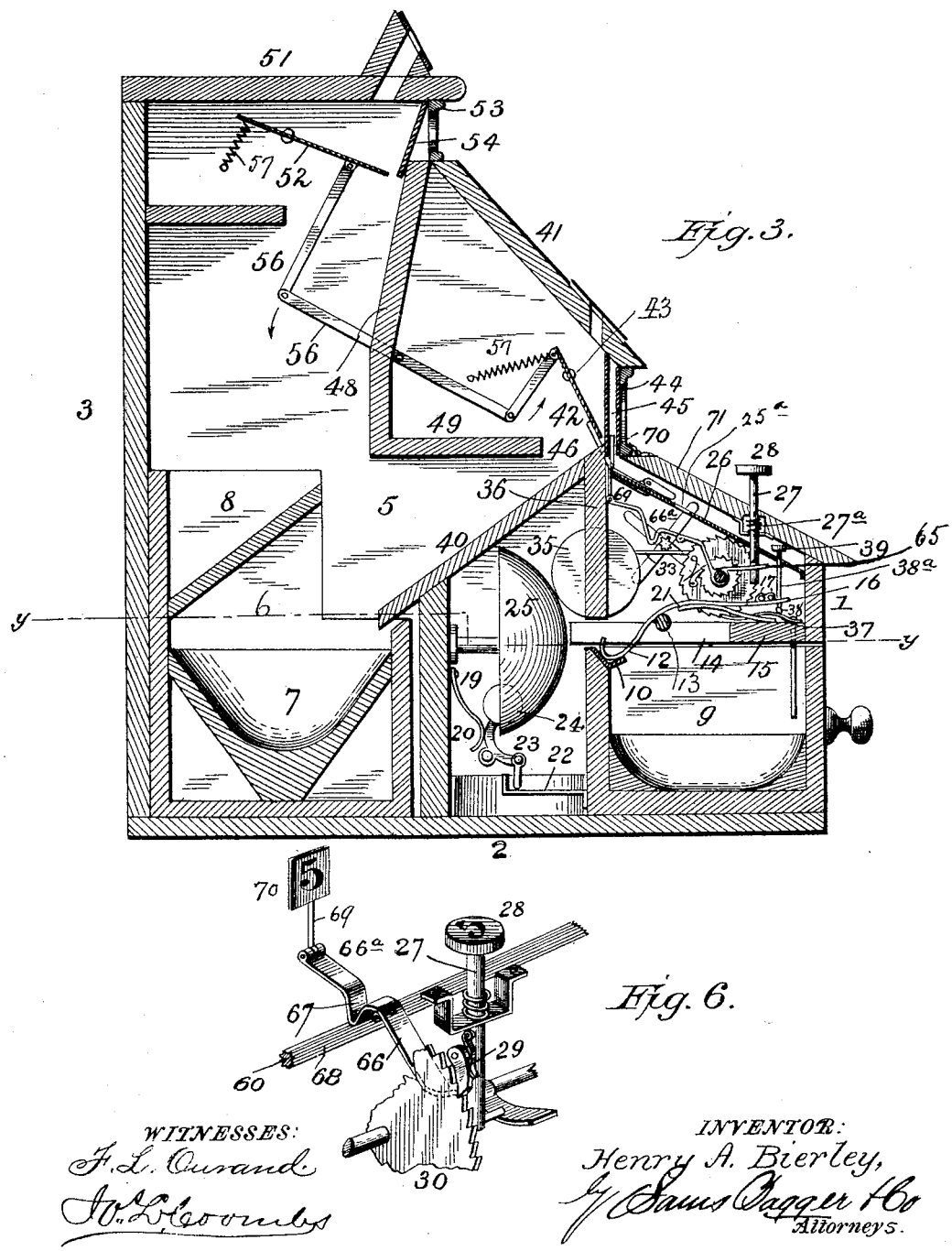
WITNESSES:
F. L. Durand
W. L. Coombs
INVENTOR:
Henry A. Bierley,
by Sams Dagger &Co
Attorneys.

(No Model.)  7 Sheets—Sheet 4.

H. A. BIERLEY.
CASH REGISTER.

No. 462,615.  Patented Nov. 3, 1891.

WITNESSES:
F. L. Durand
W. L. Coombs

INVENTOR:
Henry A. Bierley,
by Baus Jaggu & Co.
Attorneys.

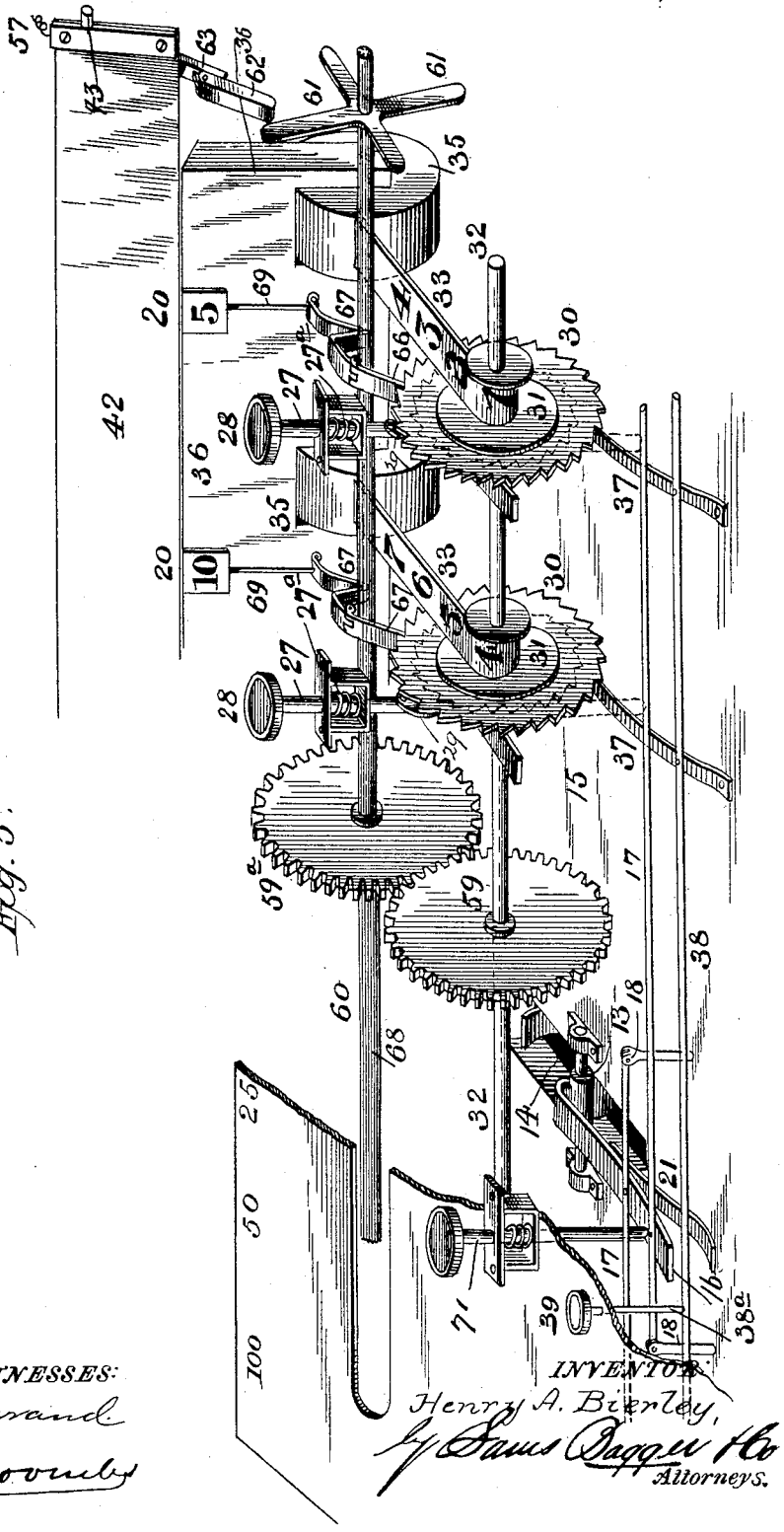

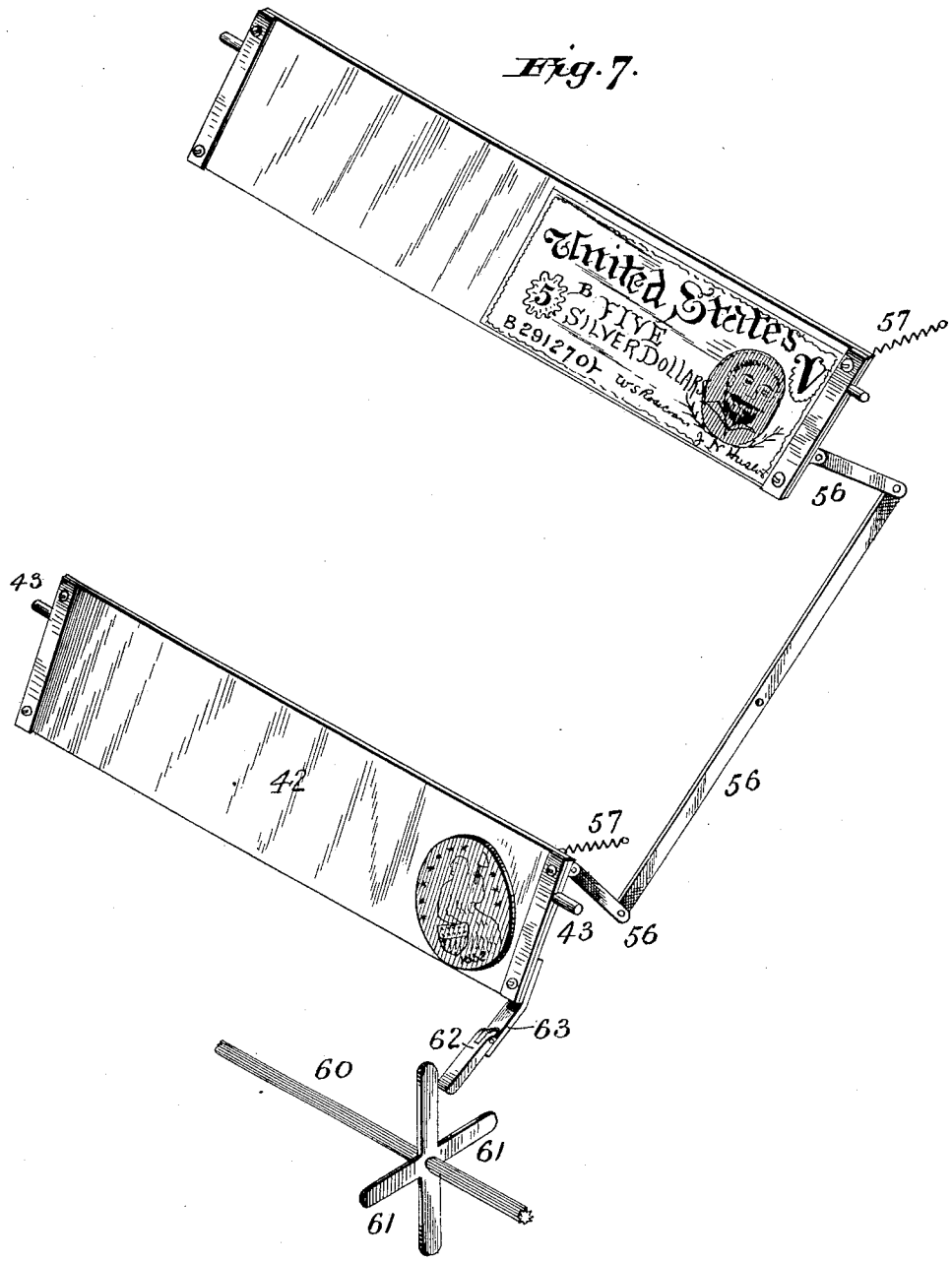

(No Model.)

7 Sheets—Sheet 7.

H. A. BIERLEY.
CASH REGISTER.

No. 462,615.

Patented Nov. 3, 1891.

WITNESSES:

INVENTOR:
Henry A. Bierley,
Attorneys.

UNITED STATES PATENT OFFICE.

HENRY A. BIERLEY, OF LEXINGTON, KENTUCKY.

CASH-REGISTER.

SPECIFICATION forming part of Letters Patent No. 462,615, dated November 3, 1891.

Application filed July 10, 1891. Serial No. 399,032. (No model.)

*To all whom it may concern:*

Be it known that I, HENRY A. BIERLEY, a citizen of the United States, and a resident of Lexington, in the county of Fayette and State of Kentucky, have invented certain new and useful Improvements in Cash-Registers; and I do hereby declare that the following is a full, clear, and exact description of the invention, which will enable others skilled in the art to which it appertains to make and use the same, reference being had to the accompanying drawings, which form a part of this specification.

My invention relates to improvements in cash-registers for stores and other places of that class in which the amount of a sale is displayed and registered and a drawer opened and an alarm sounded by depressing an opposite key.

As now generally constructed, cash-registers in which the amount of a sale is registered and indicated by depressing a key the cash-drawer is opened and the amount of the sale placed therein, the proper change, when necessary, being taken from said drawer and handed to the customer or person making a purchase. This is a serious objection, in that the till or cash-drawer and its contents are accessible to the employés of the store.

One of the objects of my invention, as before stated, is to furnish a register in which the till or cash-drawer is inaccessible, except to the parties who are entitled to handle the receipts, a separate and independent drawer being provided for the purpose of making change.

There are other advantages with respect to simplicity of construction and efficiency in operation which will be apparent to those skilled in the art to which the invention pertains.

The invention consists in the novel construction and combination of parts hereinafter fully described and claimed.

Figure 1:
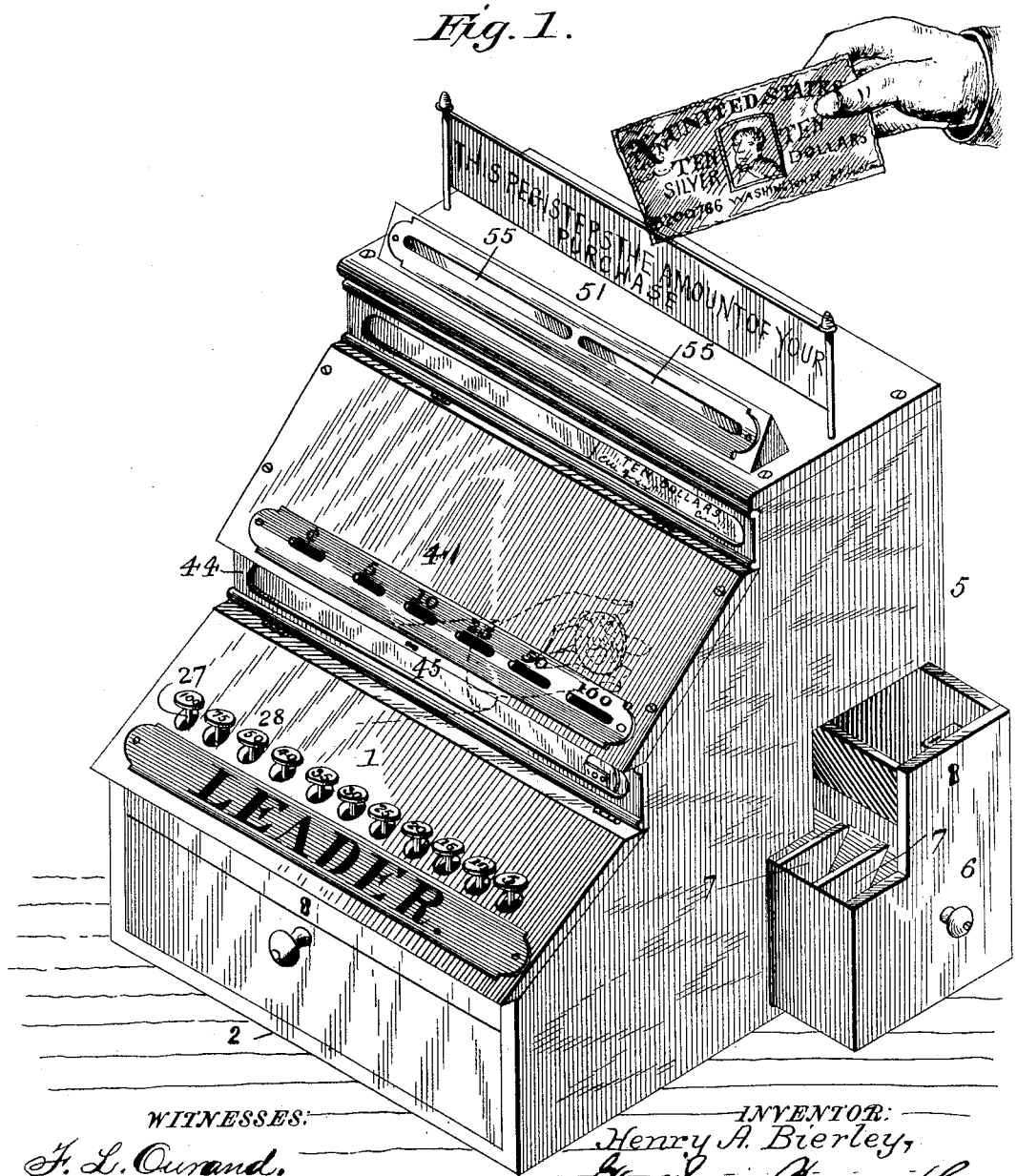
Figure 2:
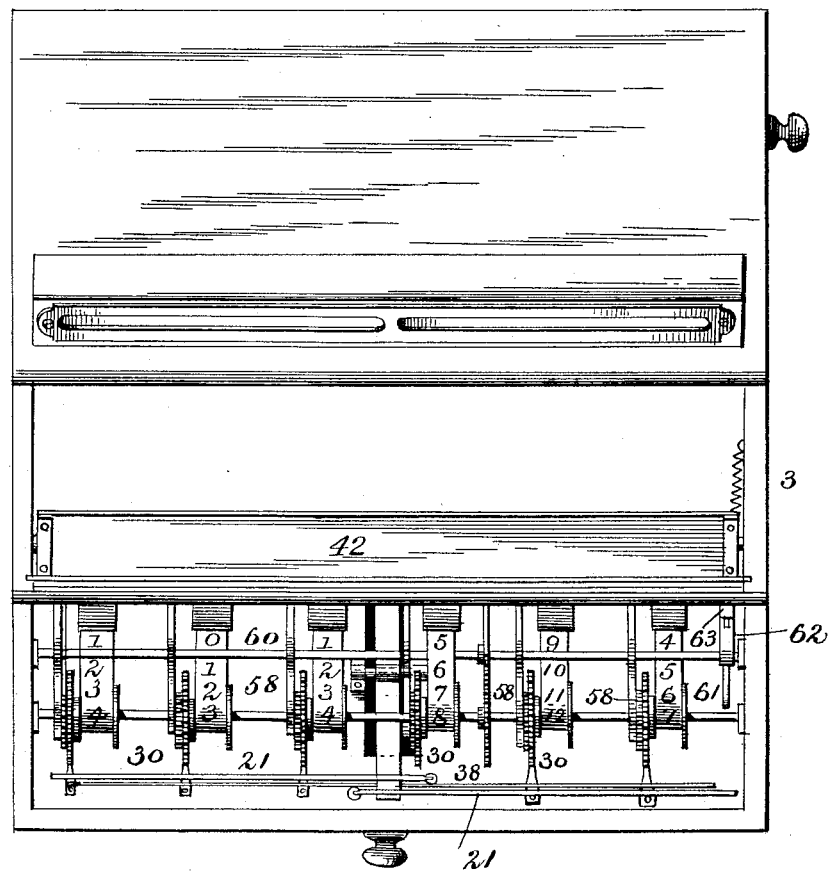
Figure 8:
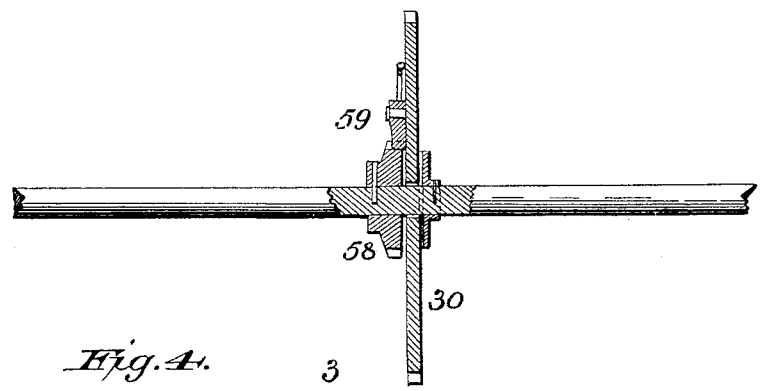
Figure 4:
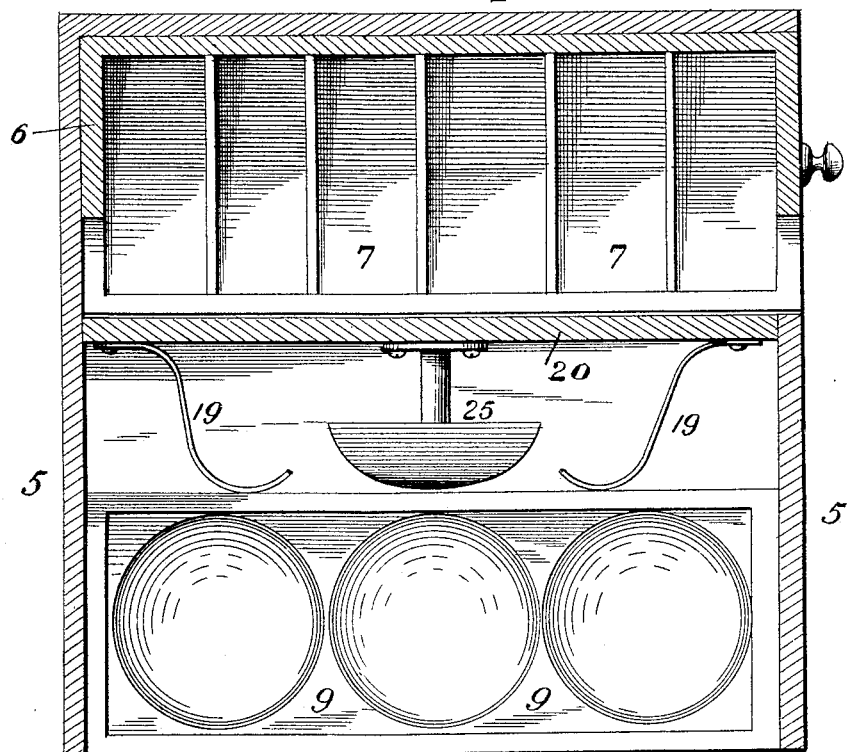
Figure 9:
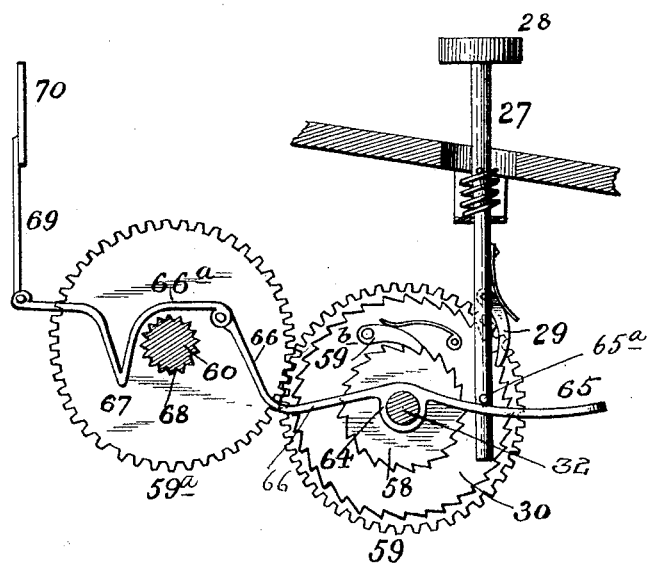
Figure 10:
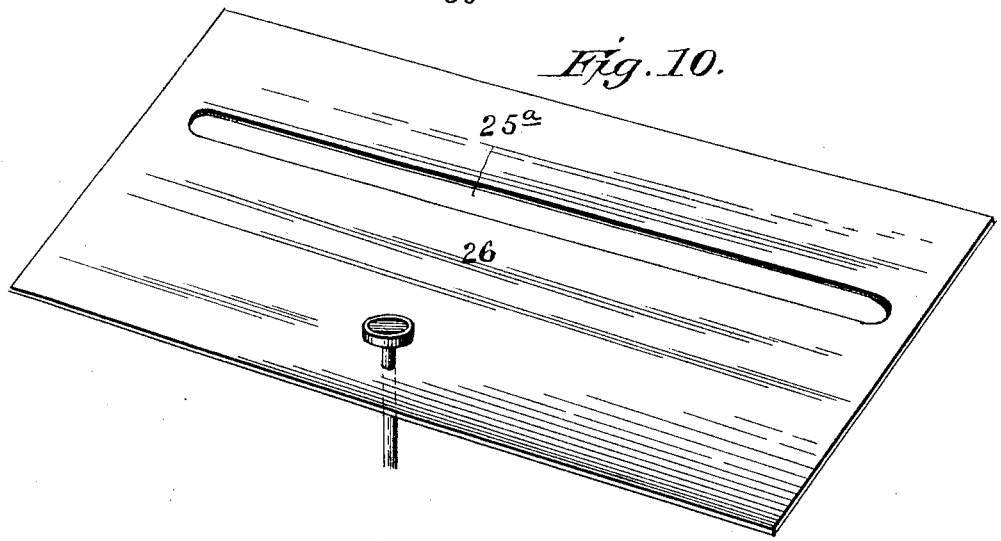

In the accompanying drawings, Figure 1 is a perspective view of a cash-register constructed in accordance with my invention, the till or cash-drawer being shown partly open. Fig. 2 is a plan view of the same, parts of the casing being removed to show the interior construction. Fig. 3 is a central longitudinal sectional view. Fig. 4 is a horizontal section on the line $y\ y$, Fig. 3. Fig. 5 is a perspective view of the mechanism for operating the indicating or registering tapes. Fig. 6 is a detail perspective view of the means of operating the display-plates. Fig. 7 is a detail perspective view of the cash-holding plates. Figs. 8 and 9 are detail sectional views of one of the ratchet-wheels operated by the indicating-keys. Fig. 10 is a perspective view of the cover through which the tapes can be inspected.

In the said drawings, the reference-numeral 1 designates the front of the casing, 2 the bottom, 3 the back wall, and 5 5 the sides, which are approximately triangular in shape or formed with inclined top edges.

In the rear of the casing is located the cash-drawer or till 6, provided with a lock, so that its contents are inaccessible, except to those entitled to receive the same. This drawer is formed with a number of compartments or cash-receptacles 7 to receive coin and with a receptacle 8 at the top for the reception of bills or currency, which are deposited in a manner hereinafter described.

In the front of the casing is a change-drawer 9, having an angular plate 10 at the top of its rear wall, which engages with the end of a pivoted catch 12, mounted upon a pintle 13, extending across a slot 14 in the plate 15, which lies above and forms a cover for the drawer 9 when the latter is closed. This catch is also formed or provided with a forwardly-projecting arm 16, with which engage two transverse bars 17, pivoted to short posts 18, secured to the plate 15, so that as a key is depressed to register a sale its lower end will bear upon said bars, as shown by the dotted lines, Fig. 5, depressing the arm 16 and releasing the catch 12, allowing the drawer to be forced open by means of the springs 19, secured to a plate 20 in rear of the cash-drawer. A spring 21 is located intermediate of the arm 16 and plate 15, the tendency of which is to elevate said arm and correspondingly depress the catch 12, so that it will engage with plate 10. The bottom of the change-drawer 9 is provided with a rearwardly-extending arm 22, having its free end bent upwardly at a right angle, so as to engage with a pivoted hammer-arm 23, having a head 24, and trip the same and sound an alarm upon the bell or gong 25 when the drawer is opened.

Projecting through holes or apertures in an inclined plate or cover 26, located above the plate or wall 15, is a series of registering-keys 27, which are provided at their upper ends with disks 28, having numbers indicating different amounts, as is usual, said plate 26 having an opening 25$^a$, through which the registering-tapes can be inspected in this description of apparatus. Near their lower ends these keys are provided with spring-pawls 29, which engage with ratchet-wheels 30, having hubs 31 loose upon a transverse shaft 32, so as to rotate thereon when the keys are depressed. The keys are provided with coiled springs 27$^a$ to return them to normal position. Secured to the hubs 31 are tapes 33 of flexible material, the other ends of which are connected to spring-barrels having cases 35 secured in slots in a vertical plate 36, similar to ordinary spring tape-measures. These tapes or strips are provided on one of their sides with numbers arranged consecutively thereon from "zero" upward. There will be one of these spring-barrels and tapes for each registering-key, so that as said keys are depressed, indicating the amount of a sale, they will engage with their corresponding ratchet-wheels winding the tapes connected therewith upon their respective drums. The relative arrangement and construction of these keys, ratchet-wheels, and tapes are such that each depression of a key causes its corresponding tape to be moved forward a distance equal to one number thereon.

Secured to the plate or wall 15 is a series of spring-catches 37, the free ends of which engage with the ratchet-wheels 30, so as to prevent any backward movement thereof, and resting upon these catches is a transverse bar 38, provided with a pin 38$^a$ and knob 39, projecting through the inclined cover 26. By depressing this knob and bar the catches 37 will be disengaged from the ratchets in wheels 30, allowing the tapes to be rewound upon their spring-barrel. This is done before the beginning of a day's work, so that all the tapes will indicate "zero."

In rear of and above the spring-barrels 35 is an inclined transverse partition 40, leading to the cash-drawer, and above this partition 40 is a transverse pivoted plate 42, having lugs 43 at each end, which are journaled in the sides of the casing. A short distance in front of this plate 42 is a fixed plate 44, having a double glass front 45. In the partition 40, just back of plate 44, is a transverse opening 46, communicating with the inclined plate 40.

The numeral 41 designates a cover secured to the casing, provided with a series of openings marked, respectively, 5, 10, 25, 50, and 100 to receive coins of these denominations.

Above the partition 40 is a vertical partition 48 and a transverse partition 49. These partitions, in connection with top 51, form a chamber, in which is located a pivoted plate 52, similar to plate 42, and in front thereof is a transverse plate 53 and a glass front 54. The top 51 is provided with one or more slots 55, through which bills or currency can be introduced into the space between plate 52 and the glass front 54, so that they will rest upon said plate and be easily discerned through said front. In a similar manner the coins introduced through the openings in plate 41 will rest against plate 42, so that they will be in full sight of the party making a purchase. When these plates 42 and 52 are turned upon their pivots, so as to uncover the case leading to the cash-drawer, as hereinafter set forth, by the depression of a registering-key as another sale is indicated, the coins or bills will fall through said openings into the cash-drawer. The plates 42 and 52 are connected together by means of a rod or bar 56, so as to move in unison, and are each provided with coiled springs 57, secured thereto and to the sides of the casing, the function of which is to return the plates to normal position after having been actuated to deposit the coins or bills in the cash-drawer.

I will now proceed to describe the means for actuating said plates. Fixed to shaft 32 and abutting against the ratchet-wheels 30 is a series of ratchet-wheels 58, (one for each wheel 30,) the ratchets of which are engaged by a spring-pawl 59$^b$ on each wheel 30, so that as an indicating-key is depressed and a ratchet-wheel 30 accordingly actuated the wheels 58 will be correspondingly actuated, rotating shaft 32, which carries a cog-wheel 59, meshing with a similar wheel 59$^a$, fixed to a transverse shaft 60, journaled in the sides of the casing. Upon one end of this shaft 60 are a series of radiating arms 61, (four being shown in this instance,) which engage with a tripping-lever 62 when the shaft is actuated, said tripping-lever being pivoted to an arm 63, secured to plate 42, so that the latter will be turned so as to uncover the coin-openings and allow the coin to drop into the cash-drawer, the bill-plate 52 being also turned through the connecting rod or bar 56.

The object of the double glass front 45 is that a display-plate may be projected upwardly therebetween, indicating the amount of a sale as a key is depressed. This I accomplish by the following means: The numeral 64 denotes a rod or bar, which is loosely pivoted on the shaft 32, having a forwardly-extending arm 65, which is adapted to be struck by a pin 65$^a$ on an indicating-key when depressed. Each of these bars also has a rearwardly-extending arm 66, pivoted or hinged to an arm 66$^a$, provided with a downward extension or lug 67 intermediate of its ends, which is adapted to engage with the upper one of a series of longitudinal grooves 68 in the shaft 60. The rear ends of these bars are provided with hinged or pivoted vertical rods 69, carrying at their upper ends display-plates 70, which will be projected up between the glass fronts 45 and indicate to the purchaser the amount of his purchase. There will of course be one of these display-plates and connections for each indicating-key, and the number thereon will correspond with the number on the key. When a key is depressed to indicate a sale, the pin 65ª thereon will strike the arm 65, depressing the same and elevating arm 66 and causing the arm 66ª to be drawn forward. The lug 67 will strike shaft 60 and be elevated, also elevating rod 69 and plate 70, corresponding with the key depressed. The lug 67 will also engage with the grooves 68 in the shaft 60, and thus be prevented from falling down when the key is released, so that the plate 70, displaying the amount of the sale, will remain in its elevated position and in sight until another key is depressed, when the shaft 60 will be rotated by the cog-wheels 59 and 59ª and connections, disengaging the lug 67 from the groove and allowing it and the plate 70 to drop down.

The numeral 71 designates a key, the lower end of which when depressed will strike the arm 16, so as to release the catch 12 and allow the change-drawer to open. This key is used when it is desired to open the drawer without actuating the registering mechanism.

The operation is as follows: In the beginning of a day's work all the tapes carried by the spring-barrels are set at zero, the cash-drawer locked, and a sufficient amount of change placed in the change-drawer for all ordinary purposes. The apparatus is now ready for work. Supposing that a customer makes a purchase amounting to, say, fifty cents, and tenders a fifty-cent coin in payment thereof. The employé depresses the fifty-cent key, which will by means of its spring-pawl move the corresponding ratchet-wheel and cause the tape connected with its hub to move from zero to 1, thus indicating through the display-opening that one sale to the value of fifty cents has been made. At the same time the lower end of the key will strike and depress the bars 17, actuating the pivoted lever, releasing the catch 12, and allowing the change-drawer to be forced open by the springs 19 and sounding an alarm. While these operations are being performed the rod 66 is also tripped by the key, causing the vertical arm carrying the display-plate to be forced upwardly, projecting said plate between the glass fronts, so that the amount indicated thereon will be in full sight of the purchaser. The lug 67 will then be raised up and will catch in the grooves in the shaft 60 and will be held until another key is depressed, indicating a subsequent sale. At the same time the ratchet-wheel 30 will be rotated or turned a short distance, causing the shaft 32 to be correspondingly turned, and by means of the cog-wheels 59 and 59ª, turning shaft 60, which by means of the radial arms 61 will trip the lever 12 and cause the plates 42 and 52 to be turned on their pivots, so that any cash which may have been deposited previously is dropped into the cash-drawer. Upon the pressure on the key being relieved it will resume normal position by means of springs, and the plates 42 and 52 will also be returned to normal by means of springs 57, closing the openings leading to the cash-drawer. The coin received from the purchaser will then be inserted in its proper slot and will fall into the space between the glass fronts 45 and be in plain sight. The display-plate indicating the amount of purchase will remain in sight until a subsequent sale is made and the appropriate key depressed. This is accomplished by means of the grooved shaft 60, as before set forth. When bills are tendered in payment instead of coins, they are placed in the bill-openings, the operation of the apparatus being otherwise the same. At the close of business the aggregate amount of sales can be ascertained from the indicating-tapes, and the cash in the cash-drawer, plus any change given, must correspond therewith, the change-drawer being credited with the amount in the cash-drawer over and above the sales registered—that is to say, suppose at the beginning of business ten dollars in change is in the change-drawer and during the day sales to the amount of one hundred dollars have been made and change to the amount of five dollars given out, then there will be one hundred and five dollars in the cash-drawer and five dollars in the change-drawer, while the tapes will register "$100," the amount of sales made, the sum in the cash-drawer always balancing the amount indicated by the tapes plus the cash in the change-drawer. The plate 71, hinged to the casing, is intended to be locked and the key kept by the proprietor of the store or other person in authority.

Having thus described my invention, what I claim is—

1. In a cash-register, the combination of the casing, the spring-barrels carrying tapes with indicating characters, the transverse shaft carrying loose ratchet-wheels, the hubs connected with said ratchet-wheels, the ratchet-wheels fixed on said shaft, the spring-pawls engaging therewith, the indicating-keys having spring-pawls, the transverse shaft, the cog-wheels carried by said shafts, the radial arms, the pivoted plates for retaining the cash in sight, and the pivoted arm adapted to be actuated by said radial arms, substantially as described.

2. In a cash-register, the combination of the casing, the spring-barrels, the registering-tapes, the transverse shafts 32 and 60, the loose ratchet-wheels 30, the fixed ratchet-wheels 58, the indicating-keys, the pawls 29 and 59ᵇ, the spring-catches 37, the bar 38, and the pivoted rods 17, substantially as described.

3. In a cash-register, the combination of the casing, the spring-barrels and tapes, the shafts 32 and 60, the loose ratchet-wheels 30, havings pawls 59ᵇ, the fixed ratchet-wheels 58, the spring-actuated indicating-keys, the cog-wheels 59 59ᵃ, the radial arms 61, the lever 62, the arm 63, the plate 42, and the plate 52, connected therewith, substantially as described.

4. In a cash-register, the combination of the casing, the shafts 32 and 60, the spring-barrels 35, the tapes 33, the ratchet-wheels 30, the hubs 31, the pawls 59ᵇ, the ratchet-wheels 58, the indicating-keys having pawls 29, the arms 66, pivoted in shaft 32 and having forwardly-extending arms 65, the arms 66ᵃ, hinged to arms 66, the lugs 67, adapted to engage with grooves in shaft 60, and the vertical bar hinged to arm 66ᵃ and carrying a display-plate, substantially as described.

In testimony that I claim the foregoing as my own I have hereunto affixed my signature in presence of two witnesses.

HENRY A. BIERLEY.

Witnesses:
AUGUST PETERSON,
BENNETT S. JONES.